United States Patent [19]

Chamberlain et al.

[11] Patent Number: 5,280,058
[45] Date of Patent: Jan. 18, 1994

[54] COLOR PREVENTION IN TITANIUM CATALYZED HYDROGENATED DIENE POLYMERS

[75] Inventors: Linda R. Chamberlain, Richmond; Carma J. Gibler, Houston; Miguel Prado, Sugarland, all of Tex.

[73] Assignee: Shell Oil Company, Houston, Tex.

[21] Appl. No.: 49,685

[22] Filed: Apr. 16, 1993

Related U.S. Application Data

[62] Division of Ser. No. 889,349, May 28, 1992, Pat. No. 5,242,961.

[51] Int. Cl.⁵ ............................................. C08F 8/04
[52] U.S. Cl. ................................. 524/147; 524/572; 525/329.8; 525/331.7; 525/332.8; 525/332.4; 525/333.1; 525/333.2; 525/338; 525/339; 525/383
[58] Field of Search ............... 525/383; 524/147, 572

[56] References Cited

U.S. PATENT DOCUMENTS

| | | |
|---|---|---|
| 2,787,647 | 4/1957 | Crouch et al. . |
| 2,893,982 | 7/1959 | Campbell . |
| 2,953,554 | 9/1960 | Miller et al. .................. 260/94.3 |
| 2,984,658 | 5/1961 | Seydel et al. . |
| 3,074,921 | 1/1963 | Carter . |
| 3,090,777 | 5/1963 | Antonsen et al. . |
| 3,119,797 | 1/1964 | McGaughy et al. . |
| 3,496,156 | 2/1970 | Luciani et al. . |
| 3,780,138 | 12/1973 | Hassell et al. . |
| 4,396,761 | 8/1983 | Willis et al. . |
| 4,403,074 | 9/1983 | Moczygemba . |
| 4,501,857 | 2/1985 | Kishimoto et al. . |
| 4,581,431 | 4/1986 | Yamazaki et al. . |
| 4,595,749 | 6/1986 | Hoxmeier . |
| 4,673,714 | 6/1987 | Kishimoto et al. . |

FOREIGN PATENT DOCUMENTS

| | | |
|---|---|---|
| 067645 | 12/1982 | European Pat. Off. . |
| 090163 | 2/1983 | European Pat. Off. . |
| 186918 | 7/1986 | European Pat. Off. . |
| 339986 | 11/1989 | European Pat. Off. . |
| 2257917 | 11/1972 | Fed. Rep. of Germany . |
| 51018-782 | 6/1974 | Japan . |
| 52081393 | 12/1975 | Japan . |
| 52085277 | 8/1976 | Japan . |
| 56024-407 | 8/1979 | Japan . |
| 58187-409A | 4/1982 | Japan . |
| 59142-212A | 2/1983 | Japan . |
| 59161-412A | 3/1983 | Japan . |
| 60040-104A | 8/1983 | Japan . |
| 62079-211A | 10/1985 | Japan . |
| 62079-252A | 10/1985 | Japan . |
| 62197-401A | 2/1986 | Japan . |
| 01056712-A | 8/1987 | Japan . |
| 01056713-A | 8/1987 | Japan . |
| 01135-801A | 11/1987 | Japan . |
| 63264-602A | 11/1987 | Japan . |
| 01182307-A | 7/1989 | Japan . |
| 01182308-A | 7/1989 | Japan . |

*Primary Examiner*—Bernard Lipman
*Attorney, Agent, or Firm*—Donald F. Haas

[57] ABSTRACT

The present invention is an improvement upon a process for hydrogenating a diene polymer by contacting the polymer in the presence of hydrogen with a titanium hydrogenation catalyst. The improvement comprises preventing discoloration of the hydrogenated polymer by treating it with water, a peroxide or alcohol in the absence of oxygen and adding a non-phenolic antioxidant to the polymer.

6 Claims, No Drawings ns, as well as linear, star or radial.
COLOR PREVENTION IN TITANIUM CATALYZED HYDROGENATED DIENE POLYMERS This is a division of application Ser. No. 07/889,349, filed May 28, 1992 U.S. Pat. No. 5,242,961.

BACKGROUND OF THE INVENTION

The present invention relates to a method for preventing color in hydrogenated diene polymers. More particularly, the invention relates to a method for preventing color in block copolymers of conjugated dienes and vinyl aromatic hydrocarbons that have been hydrogenated using titanium-based catalysts.

Titanium catalysts can now be used for hydrogenating diene polymers, especially block copolymers of conjugated dienes and vinyl aromatic hydrocarbons which require selective hydrogenation. These catalysts have advantages over the nickel catalysts used in the past in that less catalyst can be used to achieve the same amount of hydrogenation. This makes the removal of the catalyst easier and, in some cases, the catalyst residue may remain in the polymer because the amount is so low.

For instance, U.S. Pat. No. 5,039,755 describes a process for the hydrogenation of conjugated diolefin polymers which involves termination of the diolefin polymer with hydrogen. Then the polymer is hydrogenated in the presence of at least one bis(cyclopentadienyl)titanium compound of the formula:

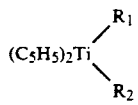

wherein $R_1$ and $R_2$ are the same or different and are selected from the group consisting of halogen groups, $C_1$-$C_8$ alkyl and alkoxy groups, $C_6$-$C_8$ aryloxy groups, aralkyl, cycloalkyl groups, silyl groups and carbonyl groups. The hydrogenation step is carried out in the absence of hydrocarbon lithium and alkoxy lithium compounds. Other titanium catalyst systems which can be used for the hydrogenation of such polymers include those disclosed in U.S. Pat. Nos. 4,501,857, 4,673,714 and 4,980,421.

In some cases, especially at high catalyst levels, a yellow color is imparted to the polymer. Conventional methods of removing this color such as full-scale acid extraction are not preferred because this deashing step is costly. Therefore, it is an object of the present invention to provide a method for hydrogenating diene polymers with a titanium hydrogenation catalyst and to produce a hydrogenated polymer that does not have a yellow color.

SUMMARY OF THE INVENTION

The present invention provides a method to prevent the yellow color imparted by titanium hydrogenation catalysts to diene polymers, especially block copolymers of conjugated dienes and vinyl aromatic hydrocarbons. The process involves treating the hydrogenated polymer with either water, peroxide or alcohol in the absence of oxygen and then adding a non-phenolic antioxidant to the polymer after hydrogenation.

DETAILED DESCRIPTION OF THE INVENTION

As is well known, polymers containing both aromatic and ethylenic unsaturation can be prepared by copolymerizing one or more polyolefins, particularly a diolefin, by themselves or with one or more alkenyl aromatic hydrocarbon monomers. The copolymers may, of course, be random, tapered, block or a combination of these, as well as linear, star or radial.

Polymers containing ethylenic unsaturation or both aromatic and ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an anionic polymerization initiator such as Group IA metals, their alkyls, amides, silanolates, napthalides, biphenyls and anthracenyl derivatives. It is preferred to use an organoalkali metal (such as sodium or potassium) compound in a suitable solvent at a temperature within the range from about $-150°$ C. to about 300° C., preferably at a temperature within the range from about 0° C. to about 100° C. Particularly effective anionic polymerization initiators are organolithium compounds having the general formula:

$$RLi_n$$

Wherein:
R is an aliphatic, cycloaliphatic, aromatic or alkyl-substituted aromatic hydrocarbon radical having from 1 to about 20 carbon atoms; and n is an integer of 1 to 4.

Conjugated diolefins which may be polymerized anionically include those conjugated diolefins containing from 4 to 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Conjugated diolefins containing from 4 to about 8 carbon atoms are preferred for use in such polymers. Alkenyl aromatic hydrocarbons which may be copolymerized include vinyl aryl compounds such as styrene, various alkyl-substituted styrenes, alkoxy-substituted styrenes, 2-vinyl pyridine, 4-vinyl pyridine, vinyl naphthalene, alkyl-substituted vinyl naphthalenes and the like.

The polymers which can be used in accordance with the process of this invention include all of those described in the aforementioned U.S. Pat. No. 5,039,755 which is herein incorporated by reference. In the production of all of these, the polymerization is terminated by utilizing hydrogen gas in place of the conventionally used alcohol terminating agent. The living polymer, or more accurately, the living end of the polymer chain, is terminated by the addition of hydrogen thereto.

As stated above, the hydrogenation step of the present process is carried out in the presence of a titanium compound. Preferably, it is carried out in the presence of a bis(cyclopentadienyl)titanium compound of the formula set forth above as described in U.S. Pat. No. 5,039,755, which is herein incorporated by reference. The hydrogenation can also be carried out with the catalysts and according to the processes described in U.S. Pat. Nos. 4,501,857, 4,673,714 and 4,980,421, which are all herein incorporated by reference.

In general, the hydrogenation is carried out in a suitable solvent at a temperature within the range of from 0° to 120° C., preferably 60° to 90° C., and at a hydrogen partial pressure within the range from 1 psig to 1200 psig, preferably from 100 to 200 psig. Catalyst concentrations within the range from 0.01 mM(millimoles) per 100 grams of polymer to 20 mM per 100 grams of polymer, preferably 0.04 to 1 mM catalyst per 100 grams of polymer, are generally used and contacting at hydrogenation conditions is generally continued for a period of time within the range from 30 to 360 minutes. Suitable solvents for hydrogenation include, among others, n-heptane, n-pentane, tetrahydrofuran, cyclohexane, toluene, hexane and benzene. Because of the small amount of catalyst present in the polymer after hydrogenation, it is not necessary to separate the hydrogenation catalyst and catalyst residue from the polymer. However, if separation is desired, it may be carried out using methods well known in the prior art such as acid extraction. Hydrogenation may be carried out in other manners such as batch processes, continuous processes, and semi-continuous processes.

As stated above, these catalysts have a tendency to impart a yellow color to the polymer after it is hydrogenated, especially at high catalyst levels. In order to prevent the formation of this yellow color, the hydrogenated polymer is treated with either water, a peroxide or alcohol in the absence of oxygen and a non-phenolic antioxidant is added to the polymer. The process must be carried out in the absence of oxygen or else the yellow color is formed. An antioxidant is necessary to prevent long-term degradation, oxidation and instability of the polymer molecule. However, we have found that when phenolic antioxidants are used, a yellow color is imparted under time and temperature. Therefore, a non-phenolic antioxidant must be used. When peroxide or alcohol is used as described above, it is preferably used in a molar ratio of additive to catalyst of from 1:1 to 1000:1 and when water is used the ratio is 1:1 to 5000:1. This is because a minimum stoichiometric amount is needed and an excess will enhance mass transfer and kinetics.

Peroxides which may be used include monomer soluble organic peroxides and water soluble peroxides as well. Suitable water soluble peroxides include hydrogen peroxide, metal ion/peroxide systems (e.g., ferrous ion/hydrogen peroxide) and the like. Monomer soluble organic peroxides include monomer-soluble di-t-butylperoxide, benzoyl peroxide, oleyl peroxide, toluyl peroxide, t-butyl peracetate, t-butyl perbenzoate, dicumyl peroxide, t-butyl peroxide, 2,5-dimethyl-2,5-di(t-butylpheroxy)hexane, 2,5-dimethyl-2,5-di(t-butylperoxy)-hexyne-3, t-butyl hydroperoxide, cumene hydroperoxide, p-menthane hydroperoxide, cyclopentane hydroperoxide, diisopropylbenzene hydroperoxide, p-t-butylcumene hydroperiode, pinene hydroperoxide, 2,5-dimethylhexane-2,5-dihydroperoxide, and the like, and mixtures thereof. Hydrogen peroxide, which is usually used as a 3-30 weight percent aqueous solution, is preferred because of commercial availability and ease in handling.

The alcohols which may be used herein include saturated and unsaturated primary, secondary, and tertiary alcohols and polyhydroxy alcohols. For example, methanol, ethanol, propanol, butanol, pentanol, 2-ethyl-1-hexanol, methylene glycol, ethylene glycol, glycerol, vinyl alcohol, methyl carbitol and pentaerythritol could be used. Methanol is preferred because of its solubility in the hydrocarbon phase, availability, cost and ease in handling.

As stated above, the antioxidant used must be a non-phenolic antioxidant. Suitable antioxidants which can be used in the present invention include nonphenolic antioxidants such as zinc dibutylcarbamate, dilaurylthiodipropionate, diisooctyl phosphite, distearyl phosphite, triisodecyl phosphite, trilauryl phosphite, tristearyl phosphite, tris(dipropyleneglycol)phosphite, diphenyl phosphite, trisnonylphenyl phosphite, triphenyl phosphite, diphenyl isodecyl phosphite, diphenyl isooctyl phosphite, phenyl diisodecyl phosphite, diisodecyl pentaerythritol diphosphite, tetraphenyl dipropyleneglycol diphosphite, poly(dipropyleneglycol)phenyl phosphite, trilauryl trithio phosphite, distearyl pentaerythritol diphosphite, bis(2,4-di-t-butylphenyl)-pentaerythritol diphosphite, tetrakis(2,4-di-tert-butylphenyl)4,4'-biphenylylendiphosphonite, Irgafos 168. Trisnonylphenyl phosphite is preferred because of economics, availability, stability and ultimate product properties. Preferably, the antioxidant is used in an amount from about 0.005% to about 3.0% by weight because the antioxidant is optimized so that stability is imparted at the lowest antioxidant level to minimize cost and possible loss in properties.

This hydrogenation process is applicable to the prevention of yellow discoloration in all diene polymers including hydrogenated polybutadiene and polyisoprene. However, the preferred application of the present invention is with hydrogenated block copolymers of conjugated dienes and vinyl aromatic hydrocarbons. These titanium catalysts are especially effective for selectively hydrogenating only the diene portion of such polymers.

EXAMPLES

Polystyrene-polybutadiene-polystyrene block copolymers were produced via anionic polymerization and terminated with hydrogen. The polymer was then hydrogenated using bis(cyclopentadienyl)titanium dichloride, $Cp_2TiCl_2$, at concentrations varying from 38-150 ppm Ti, polymer basis. The residual unsaturation was determined by NMR and >86% of the double bonds in the polybutadiene block were saturated. The solution was anaerobically transferred to a pressure vessel to be used as feed for color improvement experiments.

Polymer solution (20-25 % wt polymer in a mixture of cyclohexane/diethyl ether) was anaerobically transferred, unless noted, to a two liter stirred glass vessel for the color improvement experiments. Mixer speeds varied from 1500-3000 rpm, unless noted. Typically, the reagent additions and gas sparging for color treatment were done in 20-60 minutes. The temperature was controlled at 70° C. unless otherwise specified.

After the treatment to avoid color, the polymer solution was solution cast and dried in a vacuum oven. Plaques 60-68 mils in thickness were pressed after drying. The yellowness indices (YI) and opacities were measured with a Hunter LabScan colorimeter. Improvements were determined by comparing the YI before treatment and the YI after treatment. Lower YI is better.

EXAMPLE 1

Effect of Non-Phenolic and Phenolic Antioxidants

A batch of polystyrene-polybutadiene-polystyrene (S—B—S—Li+) block copolymer 49,200 molecular weight was made by anionic polymerization using sec-butyllithium as the initiator in a pressurized reactor. The polymerization took place in a mixture of cyclohexane and diethyl ether. The resulting polymer solution contained 20% polymer by weight. At the end of the polymerization reaction, the reactor was sparged with hydrogen and vigorously mixed for approximately 50 minutes to terminate the "living" polymer and form a lithium hydride by-product. The polymer solution was anaerobically pressure-transferred to a pressurized vessel.

The hydrogenation of the S—B—S to form polystyrene-polyethylene-polybutylene-polystyrene (S—EB—S) block copolymer was done in a semi-continuous reaction. Twelve and a half gallons of the polymer solution was transferred to a reactor. The temperature was set at 70° C. and the polymer solution was heated while mixing. Sec-butyllithium (0.1513 g-moles) was added to the reactor and hydrogen was sparged through the solution for 30 minutes. To ensure that all the sec-butyllithium had reacted with the hydrogen gas, styrene monomer was added back to the sample of polymer solution. The absence of orange color (which would be present if sec-butyllithium reacted with styrene) verified that there was only LiH present in the polymer solution. Next, 0.0468 g-moles of bis(cyclopentadienyl)titanium dichloride was added to the polymer solution and the reactor was pressurized with hydrogen to 140 psig. The remaining 37.5 gallons of polymer solution was pumped into the reactor over the next 60 minutes. After 24 hours, the final conversion of the olefin was 94.5%. The final polymer solution contained 76 ppm Ti, polymer basis.

a) One liter of the final polymer solution was transferred anaerobically to a 2 liter vessel; one liter of water was added. The temperature was 70° C. The contents of the vessel was stirred at 2000 RPM for 20 minutes. The water phase was allowed to separate from the polymer solution and then removed. The polymer solution was placed in a vacuum oven to devolatilize the solvent. A 64 mil thick polymer plaque that was compression molded was used to determine the yellowness index. The YI was 8.

b) One liter of the final polymer solution was transferred anaerobically to a 2 liter vessel; one liter of water was added. The contents of the vessel was stirred at 2000 RPM for 20 minutes. The temperature was 70° C. The water phase was allowed to separate from the polymer solution and then removed. On a polymer basis, 1000 ppm of TNPP (trisnonyl phenyl phosphite) was added to the polymer solution. The polymer solution was placed in a vacuum oven to devolatilize the solvent. A 64 mil thick polymer plaque that was compression molded was used to determine the yellowness index. The YI was 8.

C) One liter of the final polymer solution was transferred anaerobically to a 2 liter vessel; one liter of water was added in the absence of air. The contents of the vessel was stirred at 2000 RPM for 20 minutes. The temperature of the experiment was 25° C.

The water layer was allowed to separate from the polymer solution; then, the water layer was removed from the vessel. On a polymer basis, 700 ppm of Irganox-1010, a phenolic antioxidant, was added to the polymer solution. The polymer solution was then placed in a vacuum oven to devolatilize the solvent. A 64 mil thick polymer plaque was compression molded and a Yellowness Index was measured using a Hunter LabScan Colorimeter. The YI was 93.

| Summary Table | | |
|---|---|---|
| Example | Treatment | YI |
| 1a | no air, water | 8 |
| 1b | no air, water, TNPP | 8 |
| 1c | no air, water, I-1010 | 93 |

EXAMPLE 2

Effect of Oxygen and Methanol

The polymer was synthesized in the same manner as Example 1, but the resulting molecular weight was 47,700. The polymer was also hydrogen-terminated in the same manner as Example 1. Following hydrogen termination, the polymer solution was heated to 70° C. and the polymer was sparged with hydrogen for 80 minutes in preparation for hydrogenation. The bis(cyclopentadienyl)titanium dichloride hydrogenation catalyst (0.0757 g-moles) was added to the reactor. The hydrogen pressure was maintained between 95 and 112 psig. After 300 minutes, the final conversion of the olefin was 98.4%. The final polymer solution contained 76 ppm Ti, polymer basis.

a) Two liters of the final polymer solution were contacted anaerobically in the two liter stirred vessel with methanol at 200 ppm on a polymer basis. The solution was heated to 70° C. TNPP antioxidant was added at 1000 ppm polymer basis. All mixing occurred at 2000 RPM for 20 minutes. The yellowness index of a solvent-free polymer plaque was 9.

b) Two liters of the final polymer solution were contacted anaerobically in the two liter stirred vessel with methanol at 200 ppm on a polymer basis. The solution was heated to 70° C. Irganox 1010 antioxidant was added at 700 ppm polymer basis. All mixing occurred at 2000 RPM for 20 minutes. The yellowness index of a solvent-free polymer plaque was 24.

c) Two liters of the final polymer solution were sparged profusely with a mixture of 3% oxygen in nitrogen. Then, methanol at 200 ppm on a polymer basis was added. The temperature of the solution was kept at 70° C. TNPP antioxidant was added at 1000 ppm on a polymer basis. All mixing was done at 2000 RPM for 20 minutes. The yellowness index of a solvent-free polymer plaque was 23.

d) Two liters of the final polymer solution were sparged profusely with a mixture of 3% oxygen in nitrogen. Then, methanol at 200 ppm on a polymer basis was added. The temperature of the solution was kept at 70° C. Irganox 1010 antioxidant was added at 700 ppm on a polymer basis. All mixing was done at 2000 RPM for 20 minutes. The yellowness index of a solvent-free polymer plaque was 66.

| Example | Summary Table Treatment | YI |
|---|---|---|
| 2a | no air, MeOH, TNPP | 9 |
| 2b | no air, MeOH, I-1010 | 24 |
| 2c | oxygen, MeOH, TNPP | 23 |
| 2d | oxygen, MeOH, I-1010 | 66 |

EXAMPLE 3

Isopropanol and Glycerol Use

The polymer was synthesized in the same manner as Example 1, but the resulting molecular weight was 52,300. The polymer was also hydrogen-terminated terminated in the same manner as Example 1. The polymer solution was anaerobically pressure-transferred to a pressurized vessel. Approximately 40 gallons of S—B—S polymer solution was anaerobically transferred to a stirred, pressurized reactor. Following a hydrogen gas-sparge for 2 hours at 70° C. and 140 psig, 0.038 g-moles of bis(cyclopentadienyl)titanium dichloride catalyst as a cyclohexane slurry was added to the reactor. The temperature was maintained between 67°–74° C. After 240 minutes, the final conversion of the olefin was 86.1%. The final polymer solution contained 150 ppm Ti, polymer basis.

a) Two liters of the final polymer solution were put in a 2-liter stirred glass vessel. A 3% oxygen in nitrogen stream was vigorously sparged through the polymer solution. The yellowness index of a solvent-free polymer plaque was 48.

b) Two liters of the final polymer solution were contacted anaerobically in the two liter stirred vessel with isopropanol at 1000 ppm on a polymer basis. The solution was heated to 70° C. All mixing occurred at 2000 RPM for 20 minutes. The yellowness index of a solvent-free plaque was 15.

c) Two liters of the final polymer solution were contacted anaerobically in the two liter stirred vessel with glycerol at 1500 ppm on a polymer basis. The solution was heated to 70° C. All mixing occurred at 2000 RPM for 20 minutes. The yellowness index of a solvent-free plaque was 15.

d) Two liters of the final polymer solution were contacted anaerobically in the two liter stirred vessel with isopropanol at 1000 ppm on a polymer basis. The solution was heated to 70° C. Irganox 1010 was added at 700 ppm on a polymer basis. All mixing occurred at 2000 RPM for 20 minutes. The yellowness index of a solvent-free plaque was 78.

e) Two liters of the final polymer solution were contacted anaerobically in the two liter stirred vessel with glycerol at 1500 ppm on a polymer basis. The solution was heated to 70° C. Irganox 1010 was added at 700 ppm on a polymer basis. All mixing occurred at 2000 RPM for 20 minutes. The yellowness index of a solvent-free plaque was 34.

| Example | Summary Table Treatment | YI |
|---|---|---|
| 3a | oxygen | 48 |
| 3b | no air, IPA | 15 |
| 3c | no air, glycerol | 15 |
| 3d | no air, IPA, I-1010 | 78 |
| 3e | no air, glycerol, I-1010 | 34 |

EXAMPLE 4

Peroxide Use

The polymer was synthesized in the same manner as Example 1, but the resulting molecular weight was 46,800. The polymer was also hydrogen-terminated in the same manner as Example 1. Following hydrogen termination, the polymer solution was transferred to a pressurized reactor. Approximately 1560 g of the solution containing 20% polymer was transferred to a 4-liter reactor. The polymer solution was heated to 70° C. and the reactor was pressured to 140 psig with hydrogen. The bis(cyclopentadienyl)titanium dichloride hydrogenation catalyst (0.0005 g-moles) was added to the reactor in a cyclohexane slurry. After 180 minutes, the final conversion of the olefin was 98.7%. The final polymer solution contained 76 ppm Ti, polymer basis.

a) Several grams of the polymer were devolatilized from solvent in a vacuum oven in the presence of air (oxygen). A 80 mil thick polymer plaque that was compression molded was used to determine the yellowness index. The YI was 21.

b) 500 mls of the final polymer solution were transferred anaerobically into a one liter sealed bottle. On a polymer basis, 3% w of water was added. The mixture was placed in a shaker overnight. The polymer solution was placed in a vacuum oven to devolatilize the solvent. A 80 mil thick plaque was used to determine the yellowness index. The YI was 6.

c) 500 mls of the final polymer solution were transferred anaerobically into a one liter sealed bottle. On a polymer basis, 3% w of a hydrogen peroxide and water solution (3% w hydrogen peroxide) was added. The mixture was placed in a shaker overnight. The polymer solution was placed in a vacuum oven to devolatilize the solvent. A 80 mil thick plaque was used to determine the yellowness index. The YI was 4.

| Example | Summary Table Treatment | YI |
|---|---|---|
| 4a | air | 21 |
| 4b | no air, water | 6 |
| 4c | no air, hydrogen peroxide/water | |

We claim:

1. In a process for hydrogenating a diene polymer by contacting the polymer in the presence of hydrogen with a titanium hydrogenation catalyst, the improvement which comprises preventing discoloration by treating the hydrogenated polymer with water in the absence of air and adding a non-phenolic antioxidant to the polymer.

2. The process of claim 1 wherein water is used in a molar ratio of water to catalyst of from 1:1 to 5000:1.

3. The process of claim 1 wherein the diene polymer is a block copolymer of at least one conjugated diene and at least one vinyl aromatic hydrocarbon.

4. The process of claim 1 wherein the antioxidant is trisnonylphenyl phosphite.

5. The process of claim 1 wherein the titanium catalyst is a bis(cyclopentadienyl)titanium compound.

6. The process of claim 5 wherein the titanium catalyst is bis(cyclopentadienyl)titanium dichloride.

* * * * *